Oct. 9, 1956  F. E. CARROLL, JR., ET AL  2,765,866

OIL TANK

Filed Nov. 18, 1954.  2 Sheets-Sheet 1

INVENTORS
Frank E. Carroll, Jr.
Paul R. Hughes.
BY

Their ATTORNEY

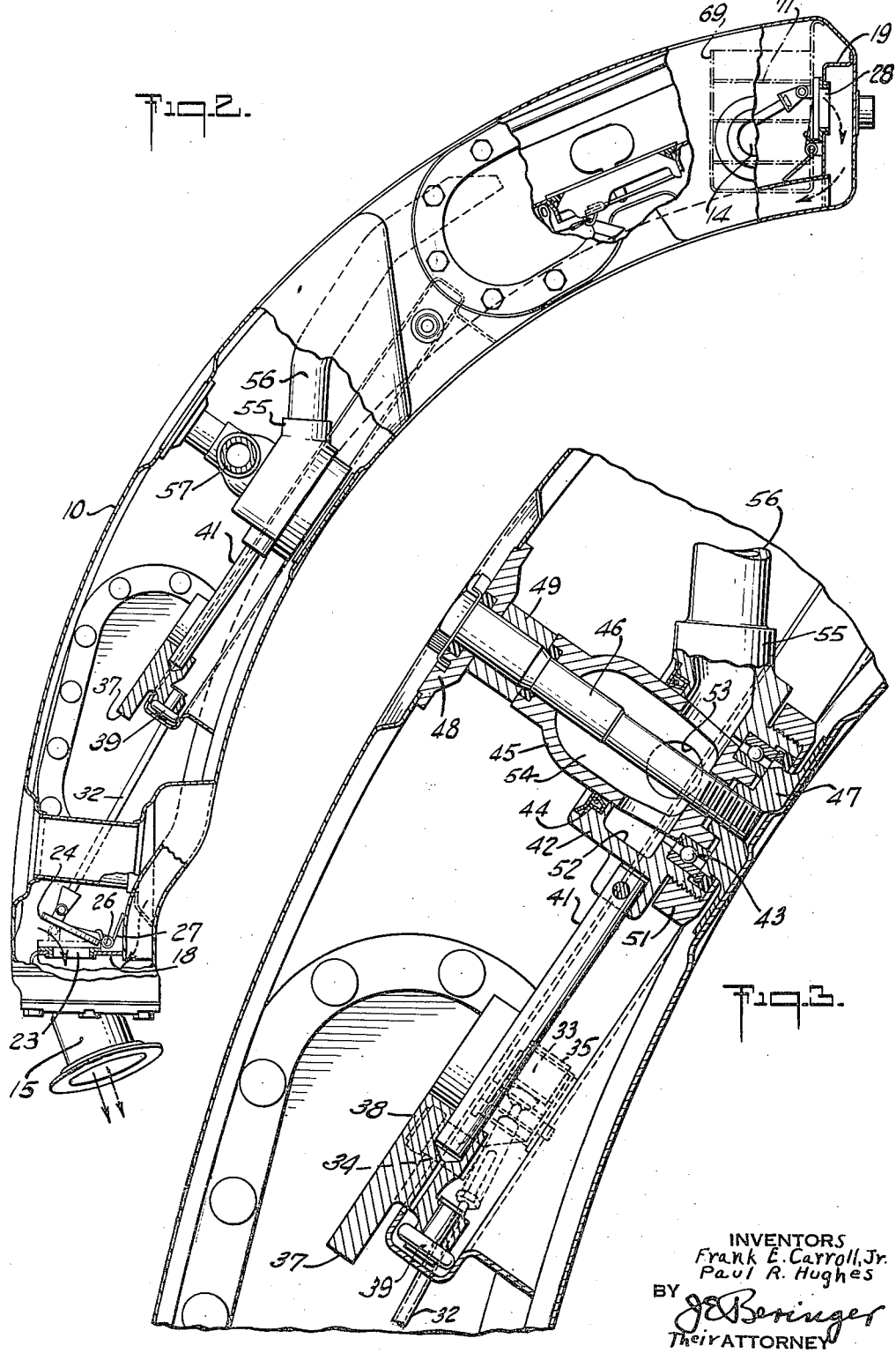

2,765,866

OIL TANK

Frank E. Carroll, Jr., Dayton, and Paul R. Hughes, Englewood, Ohio, assignors to United Aircraft Products, Inc., Dayton, Ohio, a corporation of Ohio Application November 18, 1954, Serial No. 469,733

5 Claims. (Cl. 183—2.5)

This invention relates to liquid storage and supply tanks, and particularly to tank reservoirs as used in the engine lubrication systems of aircraft to hold the supply of lubricating oil.

In such systems, the oil is circulated continuously from the tank to the engine and back to the tank, and it is of course important to maintain a steady uninterrupted flow of oil to the engine. Since aircraft in flight assume different flight attitudes, and since the body of contained oil in the tank tends to shift in response to changing flight attitudes, it is necessary to provide an oil outlet opening from the tank which is submerged in all rotary positions of the tank. Further, the tank embodies vent openings whereby air released from the returned oil may escape to atmosphere, and it is of course also desirable to maintain an open vent in the changing flight positions of the tank.

An object of the invention is to present a generally new tank structure in which the oil outlet is kept flooded in all flight attitudes and in which the interior of the tank above the oil level constantly is vented to atmosphere in all flight attitudes.

Another object of the invention, in a device of the kind described, is to provide oil flow control valves operating in conjunction with one another and in relatively remote parts of the oil tank to insure valve control in any flight attitude.

A further object of the invention is to provide for operation of the oil flow control valves by a common gravity responsive means.

Still another object of the invention is to provide for an always open venting means which is in effect a part of and is movable with the gravity responsive means.

A still further object of the invention is to provide a tank reservoir of generally new design, including a novel arrangement of baffles aiding in the release of entrained air in the returning oil.

Other objects and structural details of the invention will appear from the following description when read in connection with the accompanying drawings, wherein:

Fig. 2 is a view of the tank of Fig. 1 in side elevation, part of the side wall being broken away; and Fig. 3 is a detail view in longitudinal section of the center portion of the tank showing the mounting of the gravity responsive means.

Figure 1:
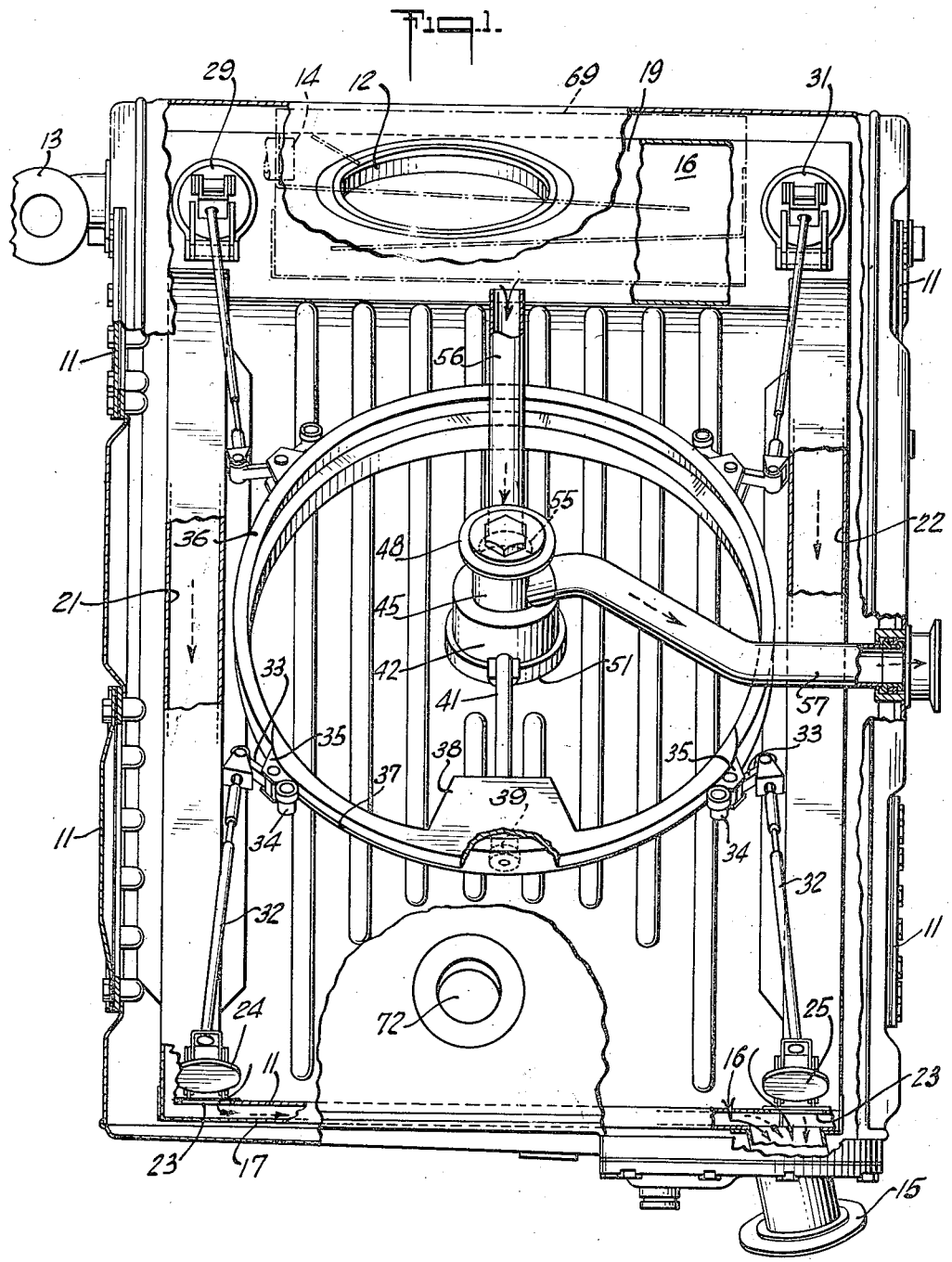
Fig. 1 is a view, substantially in front elevation, of a tank in accordance with the illustrated form of the invention, most of the front wall portion of the tank being removed to expose the interior.
Figure 1:

Referring to the drawings, the tank shell is made up of front and rear arcuate wall portions and conforming side, top and bottom portions, all of which are welded or otherwise interconnected to form a unitary shell 10. In the sides of the shell 10, or otherwise conveniently located, are access openings closed by removable plates 11. In or near the top of the front wall of the shell 10 is an opening 12 for filling of the tank.

Oil returning from the engine is admitted to the tank near the top thereof by way of an inlet fitting 13 communicating with a tube 14 arranged to discharge the oil in a horizontal stream transversely across the top of the tank in the interior thereof. Oil flow out of the tank is by way of a fitting 15 located at the bottom of the tank with its inner end communicating with a manifold chamber 16 in adjacent relation to each of the bottom and top portions of the tank shell and to the side portions thereof. Thus, at the bottom of the tank shell, in the interior thereof, spaced apart channel members 17 and 18 interfit with one another to define a closed space communicating with outlet fitting 15. At the top of the tank shell an angle member 19 cooperates with the top wall of the tank shell to define a similar closed space and the latter communicates through elongated conduits 21 and 22 with the space at the bottom of the tank defined by members 17 and 18. The whole of the intercommunicating area as described may as previously noted be considered a manifold extending about the margins of the tank in the interior thereof.

The channel member 18 is formed with openings 23 in opposite lower corners of the tank shell. Such openings are controlled by respective disc valves 24 and 25 hinged to stationary brackets 26 upstanding on the channel member 18 to the rear of the respective valves. Torsion springs 27 also are mounted on the brackets 26 and bear on the respective valves 24 and 25 in a manner to maintain these valves normally closed or in a seated position covering the openings 23.

The angle member 19 has similar openings 28 in upper opposite corners of the tank shell and these openings are controlled by valves 29 and 31 constructed and arranged in the same manner as the valves 24 and 25 and similarly urged normally to closed position.

Each of the several valves 24, 25, 29 and 31 is connected to individual actuating linkage and since the linkage for actuating each valve is the same as the linkage for actuating each other valve only one will be described. Thus, the valve 24 is pivotally connected to one end of a rod 32 extending at its other end toward the medial horizontal plane of the tank. At such other end the rod is pivotally connected to one end of a bell crank lever 33, the other end of which carries a roller 34. Intermediate its ends the lever 33 is pivotally mounted on a bracket 35 secured to a ring shaped track member 36 lying on edge on the back wall of the tank shell and rigidly connected thereto, as by welding. The several brackets 35 are secured to the track 36 in substantially oppositely disposed pairs. Thus, the bracket 35 and actuating linkage for valve 24 substantially underlies the bracket and actuating linkage for valve 29 while the brackets and actuating linkages for the valves 25 and 31 are nearly in line with one another on the opposite side of the tank.

The rollers 34 are adapted to engage and ride upon a cam surface 37 on a pendulum weight 38 which through one or more rollers 39 carried thereby is slidingly mounted on the track 36. The cam surface 37 is of a length substantially to encompass an adjacent pair of the rollers 34, and it will be understood that the function of the cam surface is to rock the arms 33 in a direction to lift and open the valves 24, 25, 29 and 31. The arrangement provided is such that at least one of the valves mentioned always is open. At or just prior to the time the surface 37 leaves one roller 34, in response to a changing flight attitude of the tank, the cam surface engages the next adjacent roller 34 and starts to open another valve so that by the time the first mentioned valve is fully closed the second mentioned valve is fully open.

The pendulum weight 38 is rigidly connected by a tubular rod to a hub member 42 in the horizontal axis of the tank. The hub member 42 is rotatably mounted, through a bearing 43 and a seal 44 on a bolt housing 45. The latter has a bolt 46 passed therethrough. One end of the bolt 46 is threaded and screwed into engagement with a plate 47 abutting the back wall of the tank shell. The opposite end of the bolt 46 abuts, through its head, a plate 48 separated from the bolt housing 45 by a spacer 49. Tightening of the bolt 46 into the plate 47 results, as will be understood, in the making of a unitary assembly of the bolt, the bolt housing 45, and the plate 47. Such assembly is, moreover, made stationary relatively to the tank shell by suitably securing the plates 47 and 48 relatively to the back and front walls of the shell, respectively. A nut 51 on the hub member 42 assists in positioning such hub member with an internal annular recess 52 therein aligned with a radial series of openings 53 in the bolt housing 45. The housing is expanded to define an internal chamber 54. The hub member 42 has a projecting boss portion 55 receiving one end of a tubular conduit 56, the other end of which projects upward toward the top of the tank. Through the conduit 56 the upper area of the tank is placed in communication with the chamber 54 in the bolt housing 45. Such chamber also communicates through a conduit 57 with the atmosphere, the conduit 57 being received at its one end through the bolt housing into the chamber 54 and being received at its other end in an externally communicating fitting 58. The described construction and arrangement of parts accordingly is such as to vent the upper area of the interior of the tank to atmosphere. Further, since the hub member 42 is rotatably mounted on the bolt housing 45 and is connected to the pendulum weight 38 it will be understood that the tubular conduit 56 tends to maintain an upright position in the tank despite changing flight attitudes. In any such flight attitude, therefore, the upper area of the interior of the tank is vented to atmosphere. The length of the conduit 56, it will be additionally understood, is such as to place the open end thereof above the oil level.

For better release of entrained air in the returning oil, such oil is discharged into the tank by way of a baffle box 69 installed in the upper end of the tank in line with the inlet tube 14 and receiving such tube through one end thereof. The baffle box 69 comprises, as indicated, a series of inclined ramps or baffles 71 which conduct the incoming oil in a relatively flat shallow stream to the bottom of the box where a suitable opening permits its descent into the tank proper. Suitable openings in the box allow for escape of air released from the shallow flowing streams on the ramps 71.

Near the bottom of the tank is a tubular reenforcing member 72, the tank being adapted at this location for connection with its stationary mount in the aircraft.

What is claimed is:

1. A tank which in use assumes different attitudes relatively to the earth's surface, including a tank shell, means defining a manifold extending marginally about said tank shell, a plurality of spaced apart inlet openings from the interior of said tank shell into said manifold, an outlet opening from said manifold, individual valves controlling said inlet openings, rods connected at their one ends to respective valves and extending toward the medial horizontal plane of the tank shell at their other ends, actuating levers on said other ends of said rods, a circular track secured to said tank shell in said medial horizontal plane, and a weighted cam member rotatable on said track and engageable with said levers to open said valves, said cam member being dimensioned to hold open at least one of said valves in any position of said member on said track.

2. A tank which in use assumes different attitudes relatively to the earth's surface, including a tank shell defining a storage chamber, stationary transverse mounting means in said chamber, a circular track stationarily mounted on said shell in said chamber in concentric relation to said mounting means, a pendulum weight movable on said track and a vent tube pivotally mounted on said mounting means and connected to said pendulum weight.

3. A tank which in use assumes different attitudes relatively to the earth's surface, including a tank shell, stationary transverse mounting means installed in said tank shell, said means having a chamber communicating with the exterior of the tank shell, hub means rotatable on said mounting means, a radially projecting tube having its inner end received in said hub means and communicating therethrough with the chamber in said mounting means, a pendulum weight on said hub means holding said tube substantially upright in the tank shell against the influence of changing tank attitude, and a track on said tank shell in concentric relation to said mounting means, said pendulum weight being movable on said track.

4. A tank which in use assumes different attitudes relatively to the earth's surface, including a tank shell, stationary transverse mounting means installed in said tank shell, a circular track stationarily mounted in said tank shell in concentric relation to said mounting means, a pendulum weight movable on said track and having a cam portion, a vent tube pivotally mounted on said mounting means and connected to said pendulum weight, a series of levers spaced circumferentially about said track and sequentially engageable by said cam portion in response to movement of said weight about said track, a marginal manifold extending about said tank shell and communicating at spaced points with the interior of the tank shell, valves controlling communication of said manifold with the interior of said tank, and individual operating connections between said valves and said levers.

5. A tank for a circulating liquid and which in use assumes different attitudes relatively to the earth's surface, including a tank shell, an outlet in the bottom part of said tank shell for withdrawal of the liquid, an inlet in the upper part of said tank shell for return of the liquid to the tank, a baffle box in the upper part of the tank shell receiving the returning liquid, and discharging it into the tank proper in a flat shallow stream, and a manifold extending marginally about said tank shell communicating with said outlet and at a plurality of spaced apart points with the interior of said tank shell, a part of said manifold extending in parallel, non-communicating relation to said baffle box.

References Cited in the file of this patent

UNITED STATES PATENTS

| | | |
|---|---|---|
| 2,586,671 | Landis | Feb. 19, 1952 |
| 2,662,538 | Cervino et al. | Dec. 15, 1953 |